Nov. 16, 1965     J. W. FRANGOS     3,217,905
STORAGE SYSTEM APPARATUS
Filed July 24, 1963     6 Sheets-Sheet 1
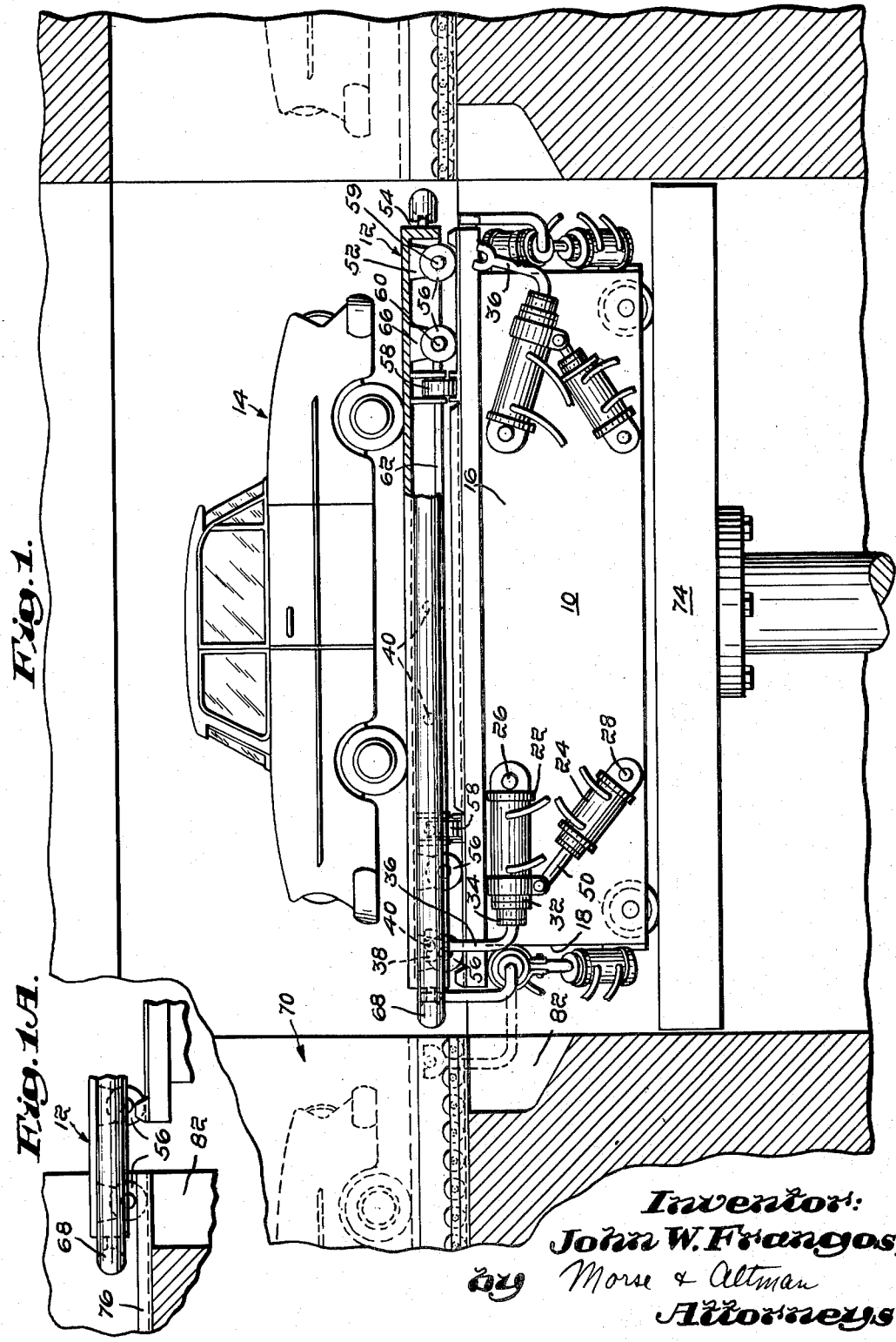
Inventor:
John W. Frangos,
by Morse & Altman
Attorneys

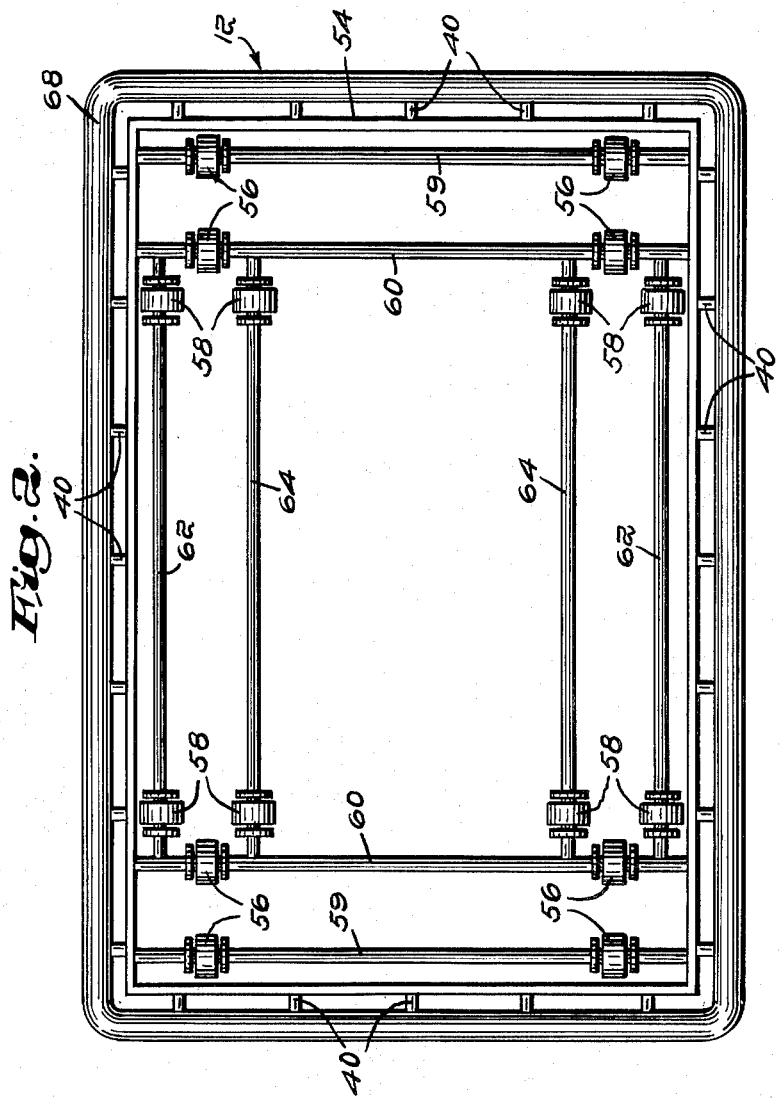

Nov. 16, 1965 J. W. FRANGOS 3,217,905
STORAGE SYSTEM APPARATUS
Filed July 24, 1963 6 Sheets-Sheet 3
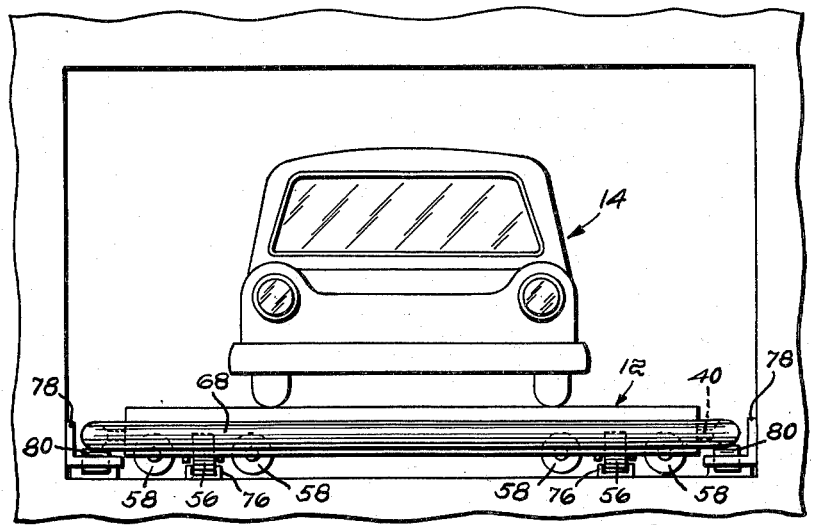
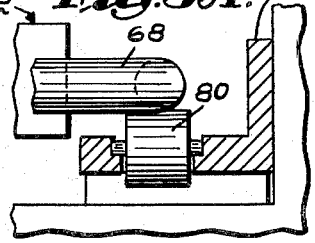
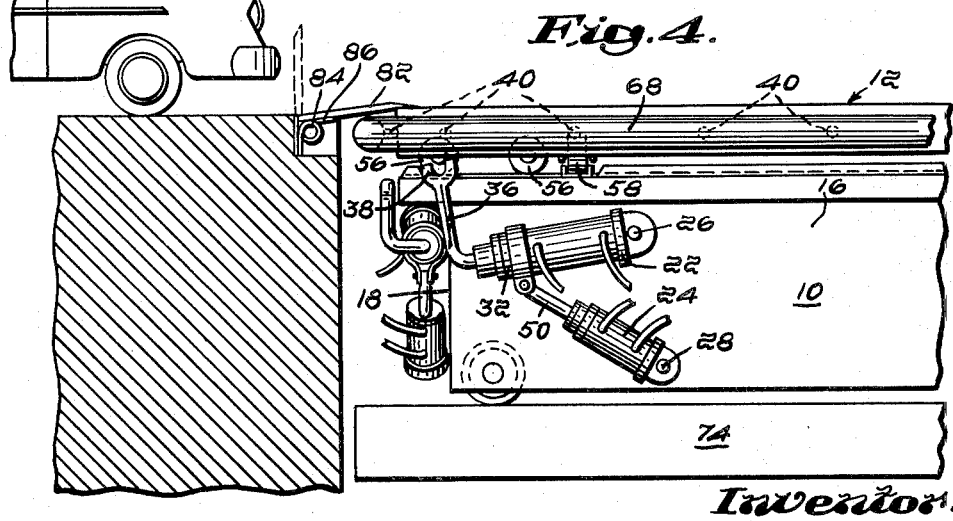
Inventor:
John W. Frangos,
by Morse & Altman Attorneys

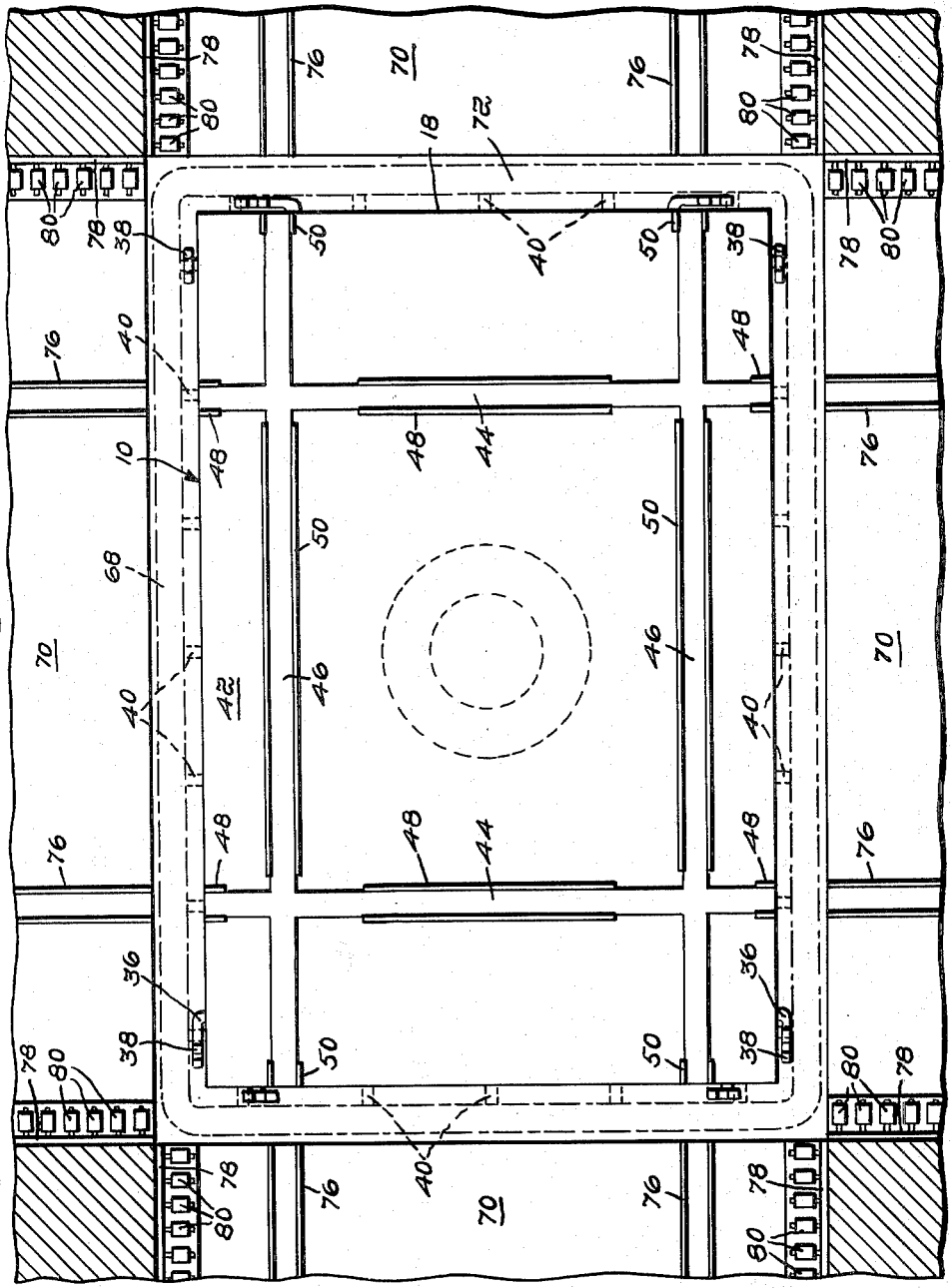

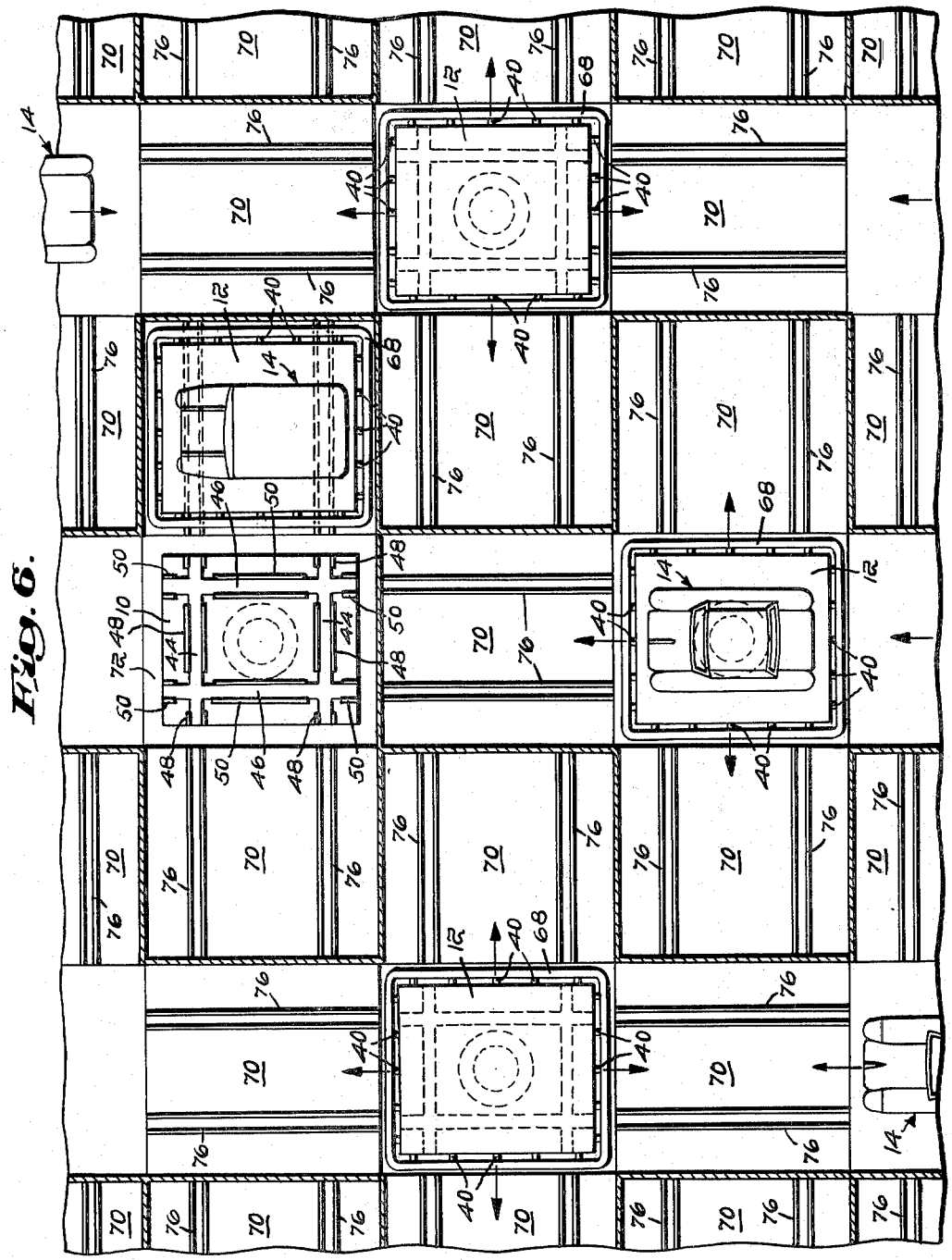

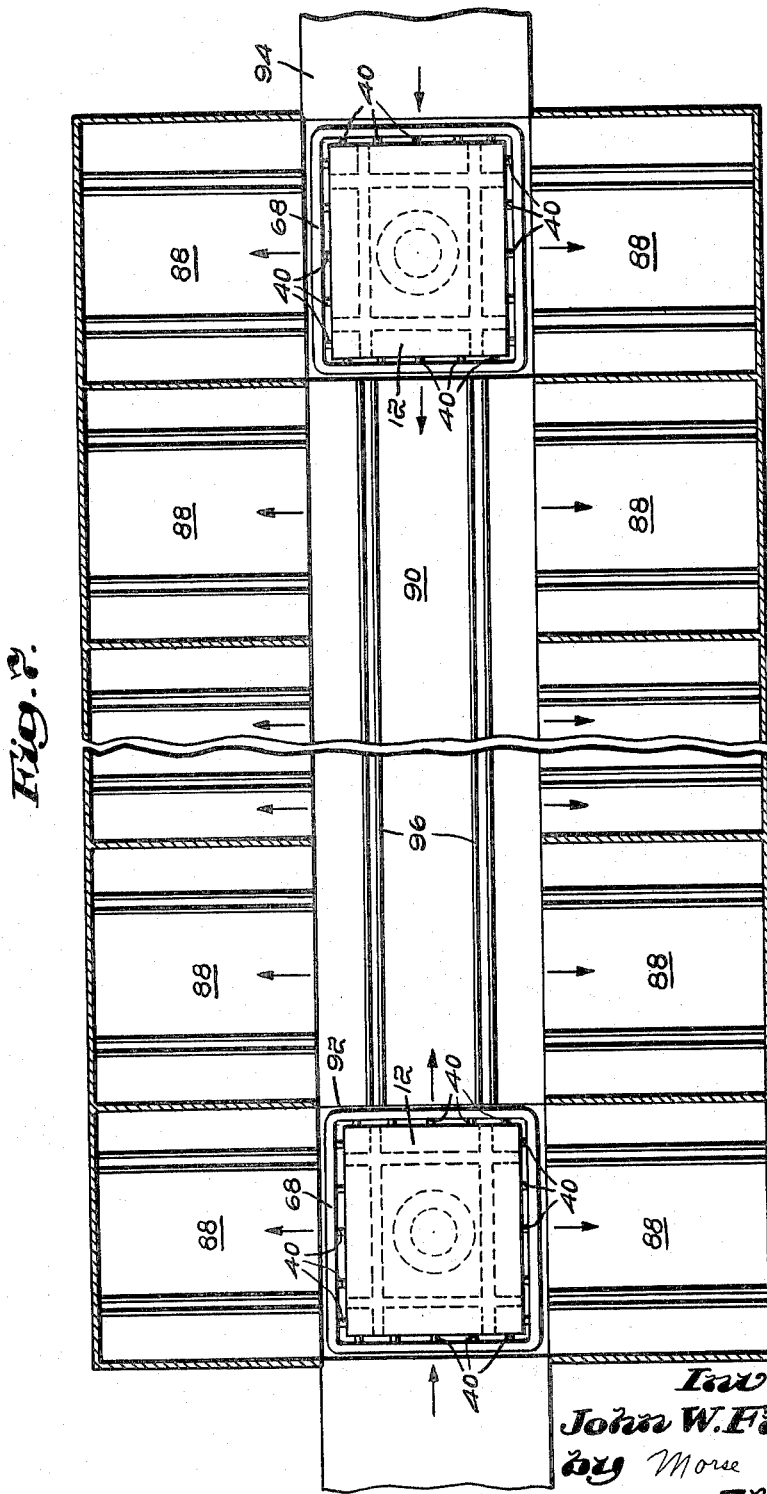

United States Patent Office
3,217,905
Patented Nov. 16, 1965

3,217,905
STORAGE SYSTEM APPARATUS
John William Frangos, 2 Brimbal Hill Drive,
Beverly, Mass.
Filed July 24, 1963, Ser. No. 297,300
6 Claims. (Cl. 214—16.1)

This invention relates generally to storage systems and more particularly is directed towards a new and improved storage system and apparatus having special utility in the parking of automobiles.

Automobile parking systems are in wide use in congested urban areas where property prices are at a premium. In multi-story garages, cars may drive up ramps or may be carried by means of an elevator. More recently automatic elevators have been provided for delivering automobiles into selected stalls. Systems developed heretofore have been of limited utility in that the automobiles could be placed in their stalls in only one direction. Also the mechanisms employed in the systems have been mechanically complicated affairs with the result that installations run into considerable expense. The capital investment required for such systems is very substantial and the financial risk is proportionately greater than for a conventional parking garage. Furthermore, current systems require constant servicing which is both expensive and time consuming. Any extended breakdown in such an automated garage may prove economically disastrous for the owner, particularly if it occurs at peak rush hours.

Accordingly, it is an object of the present invention to provide improvements in parking systems and mechanisms.

Another object of this invention is to provide a low-cost and efficient parking system and apparatus which is flexible and dependable in an operation.

Yet another object of this invention is to provide a parking system and apparatus capable of delivering an automobile in various directions into a storage area.

More particularly this invention features a new and improved parking system and apparatus featuring a moveable dolly adapted to carry a platen which is moveable to and from the dolly in directions lateral or longitudinal of the dolly. The platen in the preferred embodiment is adapted to support an automobile which is driven thereon by the operator. The invention also features a unique arrangement for mounting the platen for movement in different directions and also includes a novel driving system for transferring the vehicle supporting platen from the dolly into a selected parking stall.

But these and other features of the invention, along with further objects and advantages thereof will become more readily apparent from the following detailed description of the invention with reference being made to the accompanying drawings in which;

FIG. 1 is a view in side elevation partly in section showing an automobile transfer mechanism made according to the invention, FIG. 1a is a fragmentary detailed view in side elevation showing the platen as it moves between the dolly and a stall, FIG. 2 is a bottom plan view of the platen, FIG. 3 is a view in end elevation showing the automobile and platen located within a parking stall, FIG. 3a is a fragmentary view showing the details in construction of the stall and platen supporting system of FIG. 3, FIG. 4 is a view in side elevation partly in section showing the loading arrangement for the platen, FIG. 5 is a top plan view of the dolly showing portions of parking stalls, FIG. 6 is a plan view showing a typical layout for the parking system, and, FIG. 7 shows a modification of the system shown in FIG. 6.

Referring now to the drawings and to FIG. 1 in particular the invention is generally organized about a wheeled self-propelled dolly 10 for independent horizontal movement on which is mounted a horizontal displaceable platen 12 adapted to support an automobile 14, for example. The dolly 10 has a rectangular carriage with upright side and end walls 16 and 18 and a set of wheels 20 adapted to be power driven by any suitable power driving system (not shown) disposed within the dolly housing whereby the dolly may carry a load of a platen and car horizontally from a loading station, for example, to an elevator and thence to a parking stall. On each side sidewall and on each end wall adjacent the corners are mounted two sets of platen transfer devices each comprising a pair of cooperating power cylinders 22 and 24 and each being pivoted to the dolly 10 at 26 and 28. The cylinder 24 connects to the free end of the cylinder 22 by means of a connecting rod 30 and a collar 32. The cylinder 24 is provided with a piston rod 34 which carries a right angularly extending arm 36 having a bifurcated end 38 adapted to engage a driving pin 40 on the platen 12.

As best shown in FIG. 5 the dolly 10 is formed with a horizontal bed 42 supporting two sets of right angularly intersecting tracks 44 and 46. The tracks include channel portions 48 and 50 which extend along either side of the tracks except for those portions of the tracks adjacent points of intersection for reasons that will presently appear.

Referring now more particularly to the platen 12, it will be seen in FIG. 2 that the platen is rectangular in plan view and is of a rigid construction having a flat upper surface 52 and a marginal depending flange 54. The platen 12 has sufficient length and width as well structural rigidity to accommodate and support the automobile parked thereon. The platen 12 is characterized by sets of double rollers 56 and 58 which are mounted for rotation about horizontal axes that are mutually perpendicular. Each set comprises two rollers mounted in spaced alignment for rotation about parallel axes. For example, the set of rollers 56 is mounted on transverse axles 59 and 60 carried on the underside of the platen. The roller system for longitudinal movement of the platen includes a pair of axles 59 and 60 at each end of the platen with a set of rollers 56 mounted in alignment adjacent the ends of the axles. Similarly, the roller system for supporting the platen for transverse movement includes a pair of longitudinal axles 62 and 64 arranged in spaced parallel pairs on either side of the platen and in the same plane as the axles 59 and 60. Rollers 58 are mounted adjacent either end of each of the longitudinal axles 62 and 64 with the rollers on either end being in respective alignment. Bearing blocks 66 are employed to mount the axles to the underside of the platen.

Extending about the platen and mounted in spaced relation to the flange 54 by means of the driving pins 40, is a rigid cylindrical railing 68. The railing 68 functions to provide additional support and guidance for the platen as it is moved in and out of a parking stall or bay 70.

It will be noted that the driving pins are evenly spaced from one another and extend entirely about the platen between the railing 68 and the flange 54.

Referring now more particularly to FIGS. 3, 3a, and 5, it will be noted that in a typical installation a parking bay 70 is located on either side and at either end of an elevator well 72 in which a lift 74 is adapted to carry a dolly 10, together with its platen 12 and automobile 14, to a selected level of a multi-level structure. As best shown in FIG. 5, each bay is provided with parallel tracks 76 in alignment with either the transverse tracks 44 or the longitudinal tracks 46 on the dolly.

Extending along the lower portion of the side walls of each stall, in spaced parallel relation to the tracks 76, are brackets 78 each of which carries a plurality of rollers 80 aligned with the straight sections of the railing 68 on the platen 12. As best shown in FIG. 5, the brackets and rollers 78 and 80 for the bays to the side of the dolly and platen line up with the sections of railing extending along either end of the platen, while the rollers and brackets in the bays on either end of the dolly and platen line up with the sections of the railing extending along either side of the dolly. It will be understood that when the platen is transferred from the dolly into either a side or an end bay, the rollers 56 or 58 on the dolly will engage with the tracks 76 and the weight of the platen will be partially transferred to the brackets 78 and their rollers 80. The arrangement is such as to provide a smooth, easy and stable transfer of the platen into and out of the parking bay.

Referring again more particularly to FIG. 1, the operation of the platen transfer mechanism will be described. As previously indicated, the bifurcated end 38 of the arm 36 is adapted to engage the driving pins 40 on the platen. Normally the power cylinder 22 is in a retracted downward position such as the set of cylinders on the right hand side of the dolly 10 as viewed in FIG. 1. In this position the arm 36 is down and away from the platen. However, when a platen is to be moved on or off the dolly, the rod 30 of the cylinder 24 is extended as shown by the cylinder on the left hand side of the dolly in FIG. 1. This will bias the cylinder 22 so as to bring the bifurcated end of the arm 36 into engagement with the pin 40. Thus engaged, the piston rod 34 for the cylinder 22 is extended for a distance corresponding to the distance between pins 40. This will initiate the movement of the platen from the dolly. As soon as the piston rod 34 has extended for its full length the cylinder 34 will retract its rod 30, biasing the cylinder 22 and disengaging the arm 36 from the driving pin 40. Thereupon, the piston rod 34 and its arm 36 will retract until the bifurcated end is in line with the next driving pin. The cylinder 24 will again extend its rod 30 to bias the cylinder 22 upwardly to bring the bifurcated end of the arm 36 into engagement with the next driving pin 40. Again the rod 34 and its arm 40 will be extended to push the platen further along and the cycle is repeated until the platen is transferred entirely from the dolly to the parking bay. It will be noted in FIG. 1 that a portion of the stall 70 is cut away at 82 at the forward lower edge thereof in order to accommodate the arm 36 when in an extended position. The cycle is reversed when the platen is being transferred from a bay back onto the dolly 10.

It will be readily understood that the platen driving devices operate in pairs, one on either side of the dolly near each end, for a longitudinal transfer of the platen into a stall located at either end thereof. Likewise, pairs of platen driving devices are located at each end of the dolly adjacent either side thereof for transferring the platen into a parking stall on either side of the dolly.

In FIG. 1a it will be seen how the double rollers 56 are employed to span the gap between the edge of the dolly and the edge of the parking stall. As shown, the rollers 56 are spaced from one another by a distance at least as great as the gap so that as the leading roller is moving across the gap the trailing roller will still be on the dolly to support the platen. As the leading roller moves onto the track 76 it will support the platen as the trailing roller is moved across the gap. Thus a very simple and efficient arrangement is provided for transferring the platen across the gap in a smooth manner.

In FIG. 4 there is shown a collapsible apron 32 which is employed for driving an automobile onto a platen 12. The apron is hinged at 84 and is normally biased into the vertical position, shown in phantom, by means of a spring 86. It will be understood that as the automobile is driven towards the platen its bumper and wheels will push the apron down to bridge the gap to the platen 12 so that the automobile may be driven onto the platen. As the automobile passes over the apron it will return to its vertical position to be clear of the elevator and to provide a safety barrier along the edge of the elevator well.

In FIG. 6 there is illustrated a parking system made according to the invention. In the illustrated embodiment there is an array of staggered elevator wells 72 and associated lifts for carrying a dolly 10 to a selected level of a multi-story parking facility. It will be understood that an automobile will be driven into the facility at ground level and onto a platen which will be carried on a dolly 10 supported on a lift 34. The lift will carry the dolly, platen and car to a level having a vacant bay 70. As shown, bays are provided both on the right and left of the elevator well and to the front and rear thereof. When the lift has come to rest at the selected level, a selected pair of platen transfer devices are actuated to shift the platen with its automobile into any one of the bays. The system provides optimum use of storage space and permits quick and easy storage and retrieval of the automobile.

In FIG. 7 there is shown a modification of the system and in this embodiment a number of parking bays 88 are located along either side of a passage 90. An elevator well 92 is provided at either end or in the middle of the passage 90 to bring the dolly 10 to the passage level. A parking stall 94 may be located at each end of the passage 90. A set of parallel tracks 96 extend along the floor of the passage 90 to permit the dolly to move along the passage. It will be understood that the dolly, carrying the platen and automobile, will move itself off the lift and into the passage 90 in order to come alongside a vacant bay into which the platen and its automobile are transferred. The platen and automobile may be also stored in any end bay if desired by merely moving the dolly down to the end of the passage.

The invention described herein provides a low-cost, efficient and dependable storage system and apparatus. The parking and retrieving of automobiles or other stores may be carried out rapidly with no danger of damage to the car since the car is carried rather than driven to and from its parking bay. Cars may be stored to either side or to either end of the dolly thus making possible the maximum use of available space.

While the invention has been described with particular reference to the illustrated embodiments, it will be understood that numerous modifications thereto will appear to those skilled in the art. Also it will be understood that the above description and accompanying drawings should be taken as illustrative of the invention and not in a limiting sense.

Having thus described the invention, what I claim and desire to obtain by Letters Patent of the United States is:

1. Apparatus for delivering an automobile or the like into a parking stall located on either side or at either end of the apparatus, comprising in combination a movable dolly rolling means supporting said dolly for horizontal movement, and a platen movable onto and off of said dolly, said platen being adapted to accommodate an automobile parked thereon, one set of parallel tracks extending lengthwise along the top of said dolly and in a horizontal plane, another set of parallel tracks extending transversely along the top of said dolly co-planar with the first set of tracks and intersecting therewith, two sets of rollers mounted on the underside of said platen for engagement with said tracks, one set of said rollers being mounted for rotation about horizontal axes extending transversely of said platen and adapted to engage the tracks extending lengthwise of said dolly, the other set of said rollers being mounted for rotation about axes co-planar with the axes of said first set of rollers and extending longitudinally of said platen for engagement with the tracks extending transversely of said dolly, and selectively operable driving means on said dolly for engagement with the platen whereby said platen may be horizontally displaced longitudinally or transversely on or off said dolly.

2. Apparatus according to claim 1 wherein each set of rollers is arranged in pairs with the rollers of each pair being spaced from one another in the same plane.

3. Apparatus for delivering an automobile into a parking stall located on either side or at either end of the apparatus, comprising in combination a wheeled dolly adapted for horizontal movement to a position opposite a selected parking stall and a platen, said platen being adapted to accommodate an automobile parked thereon, one set of parallel tracks extending lengthwise along the top of said dolly and in a horizontal plane, another set of parallel tracks extending transversely along the top of said dolly co-planar with the first set of tracks and intersecting therewith, a plurality of rollers mounted on the underside of said platen for engagement with said tracks, some of said rollers being mounted for rotation about a horizontal axis extending transversely of said platen and adapted to engage the tracks extending lengthwise of said dolly, others of said rollers being mounted for rotation about axes co-planar with the axes of said first mentioned rollers and extending longitudinally of said platen for engagement with the tracks extending transversely of said dolly, a plurality of evenly spaced driving pins extending outwardly from the edges of said platen and selectively operable driving means located adjacent each corner of said dolly for engagement with the platen driving pins whereby said platen may be horizontally displaced longitudinally or transversely on or off said dolly.

4. Apparatus according to claim 3 wherein said rollers are arranged in pairs, the rollers of each pair being spaced from one another in the plane of rotation.

5. Apparatus for delivering an automobile into a parking stall located on either side or at either end of the apparatus, comprising in combination a dolly and a platen, said platen being adapted to accommodate an automobile parked thereon, one set of parallel tracks extending lengthwise along the top of said dolly and in a horizontal plane, another set of parallel tracks extending transversely along the top of said dolly co-planar with the first set of tracks and intersecting therewith, two groups of double rollers mounted on the underside of said platen for engagement with said tracks, one group of said rollers being mounted for rotation about a horizontal axis extending transversely of said platen and adapted to engage the tracks extending lengthwise of said dolly, the other group of said rollers being mounted for rotation co-planar with the axes of said first group of rollers and extending longitudinally of said platen for engagement with the tracks extending transversely of said dolly, a plurality of evenly spaced driving pins extending outwardly from the edges of said platen and selectively operable driving means located adjacent each corner of said dolly for engagement with the platen driving pins whereby said platen may be horizontally displaced longitudinally or transversely on or off said dolly, said driving means including a pair of cooperating power cylinders one of which is adapted to move the other into and out of driving engagement with said pins and the other is adapted to horizontally displace said platen.

6. A parking system for motor vehicles and the like comprising in combination, a building structure embodying a plurality of floors disposed in vertically spaced relation, said building defining at least one elevator well, an elevator disposed for vertical movement in said well to said floors, said building defining at least one horizontal passageway on each of said floors, storage bays disposed to the sides and ends of said passageways, a dolly adapted to be carried on said elevator, power means for moving said dolly along said passageway to a position opposite a selected bay, a load carrying platen adapted to be carried on said dolly, guide means disposed on said dolly directed to either side and to either end of said dolly, roller means mounted on said platen for cooperative engagement with said guide means and power transfer means on said dolly for transferring said platen in a selected horizontal direction on or off said dolly into or out of a selected bay.

References Cited by the Examiner
UNITED STATES PATENTS

| 1,468,147 | 9/1923 | Frasier | 214—16.16 |
| 1,565,907 | 12/1925 | Comb | 214—16.18 |
| 1,931,402 | 10/1933 | Black | 214—16.14 |
| 2,572,650 | 10/1951 | Molins | 214—38.8 X |
| 2,589,814 | 3/1952 | Jackson et al. | 214—41 |
| 2,712,875 | 7/1955 | Leopold | 214—16.14 |
| 3,042,228 | 7/1962 | Frangos | 214—16.14 |

HUGO O. SCHULZ, *Primary Examiner.*

GERALD M. FORLENZA, *Examiner.*